United States Patent Office 3,481,768
Patented Dec. 2, 1969

3,481,768
METHOD FOR RENDERING SOLID OR POROUS MATERIALS HYDROPHOBIC
William G. Gowdy, Midland, Mich., assignor to Dow Corning Corporation, Midland, Mich., a corporation of Michigan
No Drawing. Filed May 15, 1967, Ser. No. 638,590
Int. Cl. C09d 5/00
U.S. Cl. 117—100           6 Claims

ABSTRACT OF THE DISCLOSURE

The present invention relates to a method for rendering materials such as powdered mortar, powdered titania, powdered gypsum, powdered aluminum, powdered insecticides and fertilizers, silica, cement structures, and the like, hydrophobic. The pertinent substrate is rendered water impermeable by applying thereto a mixture of a petroleum oil and a benzene-soluble organosiloxane copolymer which is compatible with the petroleum oil wherein the organosiloxane copolymer consists essentially of $(CH_3)_3SiO_{1/2}$ units and $SiO_2$ units in which the ratio of $(CH_3)_3SiO_{1/2}$ units to $SiO_2$ units is within the range of from 0.65/1 to 1.2/1 and in which the silicon-bonded hydroxyl content of said organosiloxane copolymer is at least 0.8 weight percent based on the weight of the organosiloxane copolymer.

---

This invention relates to a method for rendering the surface of various substrates water repellent, and more particularly to a method whereby a silicone-organic composition is applied to the surface of solid or porous materials such as powdered mortar, powdered titania, powdered gypsum, powdered aluminum, silica, cement structures, and the like, whereby there is imparted to the substrate superior hydrophobic characteristics.

There are numerous methods set forth in the prior art for rendering mortar, concrete, or the like, water repellent; however, in each instance certain inherent disadvantages may exist. As a means of illustration, it is already well known that mortar or concrete can be rendered impermeable to water by employing therewith soluble soaps, lime soaps or precipitated fatty acids of different kinds, or corresponding cycloaliphatic hydrocarbons and also protein decomposition products. However, it has been found that this particular method is undesirable due to the fact that the mechanical strength of the mortar or concrete which has been so treated is substantially decreased.

Alternative methods for achieving water-repellent effects are also available, e.g., coating the pertinent substrate with ammonium or sodium stearates as the water-repellent agent. Unfortunately, this method is also considered unsatisfactory to some extent because the moisture-proofing characteristics are relatively short-lived.

In addition, various pure silicone water repellents and other silicone-organic materials have been suggested, but in many cases, the relative cost of such repellents when considered in relation to their ultimate value, makes their use virtually prohibitive.

In accordance with the above, it is an object of the present invention to provide a method whereby a silicone-organic mixture is applied to a substrate thereby rendering said substrate hydrophobic and water repellent, which method avoids the aforementioned serious disadvantages.

It is a further object of the present invention to provide a method for rendering said substrates impermeable to water which involves the use of a silicone-organic composition which is formed of easily accessible and inexpensive materials resulting in considerable cost savings to the consumer or user.

These and other objects will become apparent from a consideration of the following detailed description of the specification.

This invention relates to a method for rendering substrates hydrophobic which method comprises applying thereto a composition consisting essentially of a mixture of:

(A) from 70 to 98 percent by weight of a petroleum oil having a viscosity of from 20 to 300 SSU at 50° C., and (B) from 2 to 30 percent by weight of a benzene-soluble organosiloxane copolymer which is compatible with (A) consisting essentially of (1) $(CH_3)_3SiO_{1/2}$ units and (2) $SiO_2$ units in which the ratio of (1) units to (2) units is within the range of from 0.65/1 to 1.2/1 and in which the silicon-bonded hydroxyl content of said organosiloxane copolymer is at least 0.8 weight percent based on the weight of the organosiloxane copolymer.

Illustrative examples of the petroleum oil (A) which are operative herein are the hydrocarbon oils such as crude oil, fuel oil, light lubricating oil, naphthenic base, and mineral oil, among countless others.

The organosiloxane copolymer component designated as (B) is a well-known and readily available commercial material. Briefly, the organosiloxane copolymer (B) can be prepared by reacting an acidic silica hydrosol with trimethylchlorosilane to yield the desired organopolysiloxane. The above method is set forth in detail in U.S. Patent No. 2,676,182 which is incorporated herein by reference.

The essential characteristics of the organosiloxane copolymer (B) as defined herein are the siloxane units present, the ratio of these siloxane units, the fact that the organosiloxane copolymer is a benzene-soluble resin, the necessary silicon-bonded hydroxyl content, and the compatibility of the organosiloxane copolymer with the petroleum oil. By being "compatible" it is simply meant that the organosiloxane copolymer is at least partially soluble and/or dispersible in the petroleum oil. It is to be understood, of course, that the organosiloxane copolymer may also be completely soluble or dispersible in the petroleum oil.

The hydroxyl content of the organosiloxane copolymer (B) is critical, and as noted above, there must be a silicon-bonded hydroxyl content of at least 0.8 weight percent based on the weight of the organosiloxane copolymer. There is no maximum limitation with respect to hydroxyl content, however, it has been found that a hydroxyl content of from about 1 to 3 percent by weight is to be most preferred for purposes of the present invention.

The amount of the organosiloxane copolymer (B) employed in the above mixture need only be sufficient to effect the desired water-repellent characteristics. Hence, although a range of from 2 to 30 percent by weight of the organosiloxane copolymer is suitable, a range of from 2 to approximately 10 percent by weight is preferable and will achieve the objects of this invention.

Examples of substrates which are envisioned within the scope of this invention include cement structures, powdered mortar, powdered gypsum, powdered aluminum, cement grout, silica, powdered titania and other pigments for paint, carbon black, powdered inorganic fertilizers or insecticides, and other like materials.

In addition the compositions defined herein can be employed as water repellents for solid or porous materials, and for powders. They are suitable as anticaking agents for powdered fertilizers and powdered insecticides and as dispersing agents for hydrophylic powders in an oil medium such as paint which contains titania pigment.

Application of the unique compositions of the present invention to the appropriate substrate can be accomplished by any conventional means. Thus, the mixture defined herein is initially dissolved in any suitable mutual solvent, e.g., xylene, toluene, minerial spirits and kerosene.

The dissolved mixture is subsequent applied to the substrate by spraying, brushing, dabbing or by any other acceptable technique which may prove most feasible at the time.

It will be obvious to those skilled in the art that various modifications may be made without departing from the spirit of the invention and, therefore, the invention is not limited to what is described in the specification, but only as to what is indicated in the appended claims.

EXAMPLE 1

A composition was prepared consisting of 90 parts by weight of powdered gypsum, 9.0 parts by weight of mineral oil, and 1.0 part by weight of a copolymer consisting essentially of $[(CH_3)_3SiO_{1/2}]$ units and $(SIO_2)$ units, in which the ratio of $[(CH_3)_3SiO_{1/2}]$ units to $(SiO_2)$ units is within the range of from 0.65/1 to 1.2/1. The copolymer had a hydroxyl content of at least 0.8 weight percent. The above composition was cast into 1.0 inch square cubes and submerged entirely under water for a period of 2.0 hours. The water absorption was then measured as a percent of the total weight of the cube. The control (gypsum alone) absorbed 33.0 percent of its weight in water while the treated gypsum absorbed only 1.0 percent of its weight in water.

EXAMPLE 2

When the following proportions of mineral oil and the copolymer were substituted for the corresponding proportions in Example 1, substantially equivalent results were obtained.

(A) 7.0 parts by weight mineral oil and 3.0 parts by weight copolymer.
(B) 8.0 parts by weight mineral oil and 2.0 parts by weight copolymer.
(C) 9.5 parts by weight mineral oil and 0.5 part by weight copolymer.
(D) 9.8 parts by weight mineral oil and 0.2 part by weight copolymer.

EXAMPLE 3

When Bunker C #6 Fuel Oil, which is a commercially available fuel oil containing aliphatic, aromatic, and naphthenic petroleum fractions, was substituted for the mineral oil of Example 1, equivent results were obtained.

EXAMPLE 4

When the following materials were substituted for the gypsum in Example 1, equivalent results were obtained.

(A) powdered mortar
(B) powdered aluminum
(C) powdered titania
(D) silica
(E) cement grout
(F) carbon black
(G) powdered fertilizer
(H) powdered insecticides

EXAMPLE 5

A solution consisting of 95 parts by weight of VM and P Naptha, which is a commercially available naphthanol mineral spirits as a diluent, 4.5 parts of mineral oil, and 0.5 part of a copolymer consisting of $[(CH_3)_3SiO_{1/2}]$ units and $(SiO_2)$ units, in which the ratio of $[(CH_3)_3SiO_{1/2}]$ units to $(SiO_2)$ units is within the range of from 0.65/1 to 1.21/having a silicon-bonded hydroxyl content of approximately 2.2 weight percent was prepared.

A standard 2.0 inch square cube of concrete masonry was dipped into the above solution for 15 seconds, dried overnight (16 hours), and then placed in ¼ inch of water for 24 hours. The control (untreated cube of concrete masonry) absorbed 5.0 percent of its weight of the water while the treated cube absorbed only 0.2 percent of its weight of water.

That which is claimed is:

1. A method for rendering substrates hydrophobic which method comprises applying thereto a composition consisting essentially of a mixture of
   (A) from 70 to 98 percent by weight of a petroleum oil having a viscosity of from 20 to 300 SSU at 50° C., and
   (B) from 2 to 30 percent by weight of a benzene-soluble organosiloxane copolymer which is compatible with (A) consisting essentially of (1) $(CH_3)_3SiO_{1/2}$ units and (2) $SiO_2$ units in which the ratio of (1) units to (2) units is within the range of from 0.65/1 to 1.2/1, and in which the silicon-bonded hydroxyl content of said organosiloxane copolymer is at least 0.8 weight percent based on the weight of the organosiloxane copolymer.

2. The method as recited in claim 1 wherein the petroleum oil (A) is present in an amount of from 95 to 98 percent by weight and the benzene-soluble organosiloxane copolymer (B) is present in an amount of from 2 to 5 percent by weight.

3. The method as recited in claim 2 wherein the petroleum oil (A) is mineral oil.

4. The method as recited in claim 3 wherein the benzene-soluble organosiloxane copolymer (B) has a hydroxyl content of from 1 to 3 percent based on the weight of the organosiloxane copolymer.

5. The method as recited in claim 4 wherein the substrate is powdered gypsum.

6. The method as recited in claim 1 wherein the substrate is powdered mortar, powdered aluminum, powdered inorganic fertilizers, powdered inorganic insecticides, powdered titania, silica, carbon black, or masonry.

References Cited

UNITED STATES PATENTS

| | | | |
|---|---|---|---|
| 2,266,104 | 12/1941 | Vogel et al. | 106—308 X |
| 2,544,752 | 3/1951 | Gelbman | 117—100 X |
| 2,676,182 | 4/1954 | Dauot et al. | 106—308 X |
| 2,689,860 | 9/1954 | Rust | 117—161 X |
| 2,807,557 | 9/1957 | Carney | 117—161 X |
| 2,849,335 | 8/1958 | Palmer | 117—168 |
| 2,999,762 | 9/1961 | Verdier | 117—100 X |
| 3,004,859 | 10/1961 | Lichtenwalner | 117—100 X |
| 3,051,678 | 8/1962 | Bentov | 117—123 X |
| 3,084,066 | 4/1963 | Dunmire | 117—132 X |
| 3,132,961 | 5/1964 | Pierpont et al. | 106—308 |
| 3,175,994 | 3/1965 | Katchman | 117—132 X |
| 3,190,775 | 6/1965 | Ender | 117—100 X |
| 3,230,289 | 1/1966 | Eder et al. | 117—132 X |

WILLIAM D. MARTIN, Primary Examiner

M. R. P. PERRONE, Jr., Assistant Examiner

U.S. Cl. X.R.

106—2, 308, 309; 117—123, 132, 161, 168